United States Patent
Bursell et al.

(10) Patent No.: US 10,666,649 B2
(45) Date of Patent: May 26, 2020

(54) NEGOTIATING TRUST DEGRADATION FOR A CENTRAL ENTITY BY PEERS LACKING DIRECT COMMUNICATION WITH ONE ANOTHER

(71) Applicants: Mike Bursell, Halstead (GB); Timothy Verrall, Pleasant Hill, CA (US)

(72) Inventors: Mike Bursell, Halstead (GB); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 15/089,038

(22) Filed: Apr. 1, 2016

(65) Prior Publication Data
US 2017/0289152 A1    Oct. 5, 2017

(51) Int. Cl.
H04L 29/06 (2006.01)

(52) U.S. Cl.
CPC ............... H04L 63/0876 (2013.01)

(58) Field of Classification Search
CPC .................................................. H04L 63/0876
See application file for complete search history.

(56) References Cited

U.S. PATENT DOCUMENTS

| | | | | |
|---|---|---|---|---|
| 5,625,692 A | * | 4/1997 | Herzberg | H04L 9/085 380/286 |
| 7,539,857 B2 | * | 5/2009 | Bartlett | H04L 63/0218 709/224 |
| 8,108,536 B1 | * | 1/2012 | Hernacki | G06F 21/51 709/201 |
| 9,762,583 B2 | * | 9/2017 | Guccione | G06F 21/33 |
| 2006/0021054 A1 | * | 1/2006 | Costa | G06F 21/566 726/25 |
| 2011/0193677 A1 | * | 8/2011 | Ho | H04W 12/10 340/3.1 |
| 2015/0288709 A1 | * | 10/2015 | Singhal | H04L 63/102 726/23 |
| 2017/0126647 A1 | * | 5/2017 | Zhang | H04L 63/08 |
| 2018/0129960 A1 | * | 5/2018 | Caballero | G06Q 50/01 |

OTHER PUBLICATIONS

Aikebaier et al. Trustworthiness-based Broadcast Algorithm in Scalable P2P Group. 2011. IEEE. pp. 143-150.*
Bruno Dutertre, "Intrusion-Tolerant Enclaves", IEEE Conference on Security and Privacy, May 2002, 9 pages, Oakland California USA.
Wikipedia, "Quantum Cryptography", Wikipedia the free encyclopedia, retrieved Mar. 19, 2016, 6 pages.

* cited by examiner

*Primary Examiner* — Lynn D Feild
*Assistant Examiner* — Abdullah Almamun
(74) *Attorney, Agent, or Firm* — Jordan IP Law, LLC

(57) ABSTRACT

Systems, apparatuses and methods may provide for generating, in response to a decrease in trustworthiness with respect to a controller, a notification message and generating a message authentication code (MAC) based on the notification message and one or more locally stored keys. Additionally, the notification message and the MAC may be sent to the controller, wherein the notification message is directed to one or more peers in a network associated with the controller. In one example, the notification message includes one or more of an indication that the controller is compromised or an indication that the controller is suspected to be compromised.

21 Claims, 5 Drawing Sheets

NEGOTIATING TRUST DEGRADATION FOR A CENTRAL ENTITY BY PEERS LACKING DIRECT COMMUNICATION WITH ONE ANOTHER

TECHNICAL FIELD

Embodiments generally relate to data security. More particularly, embodiments relate to negotiating trust degradation for a central entity by peers lacking direct communication with one another.

BACKGROUND

When multiple client entities exist in the same trust domain, but rely on a central entity such as a controller or gateway to manage communications between the client entities and handle client entity tasks, the impact of compromise or spoofing of the central entity may be significant from a system-level perspective. For example, software-defined networking (SDN) may support virtualized server and storage infrastructures in data centers and high performance computing (HPC) environments. In such a case, an SDN controller may act as a centralized control point in the SDN, managing the flow of data between virtual switches that communicate with one another only through the SDN controller. Accordingly, a successful attack that compromises the trustworthiness of the SDN controller may in turn comprise the entire infrastructure.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
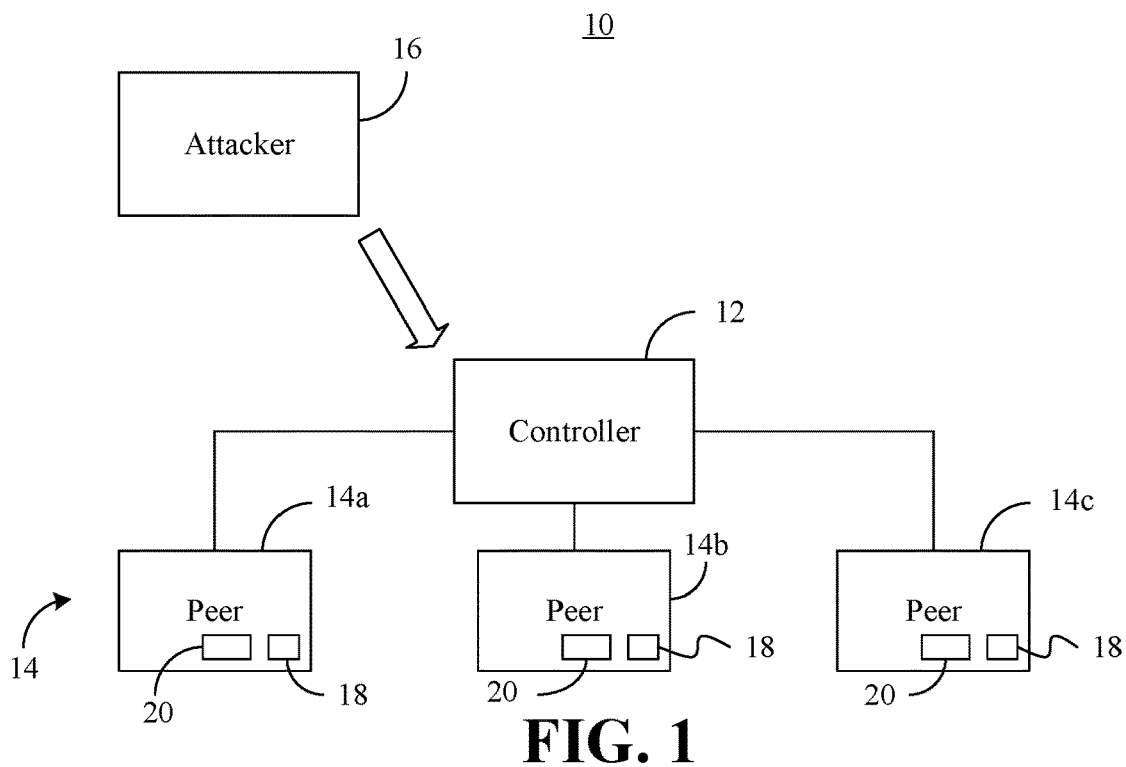
FIG. 1 is a block diagram of an example of a communication architecture according to an embodiment.

Turning now to FIG. 1, a communication architecture 10 is shown in which a central controller 12 manages a network of a plurality of peers 14 (14a-14c). The peers 14 may lack direct communication with one another and may rely on the controller 12 to pass messages among the peers 14 as well as to pass messages between the peers 14 and other systems, components, etc. (not shown). The tasks handled by the peers 14 and the controller 12 may vary depending on the circumstances. For example, if the architecture 10 is part of a software-defined network (SDN), the peers 14 may operate as virtual switches and the controller 12 may operate as an SDN controller. If, on the other hand, the architecture 10 is part of a surveillance network, the peers 14 might operate as drones and the controller 12 might operate as a command center. Moreover, if the architecture 10 is part of an Internet of things (IOT) home automation environment, the peers 14 might operate as sensors and the controller 12 may operate as a gateway. In yet another example, the peers 14 may operate as mobile phones and the controller may operate as a cell tower if the architecture 10 is part of a sparse cellular network.

As will be discussed in greater detail, each of the peers 14 may be provisioned (e.g., during manufacturing, assembly and/or post-deployment update) with one or more keys 18 (e.g., message authentication code/MAC generation key, encryption key, etc.) and a predetermined communication plan 20, wherein the controller 12 does not have access to the key(s) 18 or the plan 20. The illustrated keys 18 enable the peers 14 to send messages to one another via the controller 12 in a secure fashion. Additionally, the predetermined communication plan 20 may enable the peers 14 to determine when a decrease in trustworthiness has taken place with respect to the controller 12, based on deviations of the controller from the communication plan 20.

For example, the plan 20 might specify a deviation as a refusal of the controller 12 to send one or more messages, a failure of the controller 12 to send one or more messages, one or more missing messages in an inbound communication from the controller 12 or one or more missing messages in an outbound communication to the controller 12 (e.g., as evidenced in an outbound transmission report). The plan 20 may also specify a deviation as an indication from another peer that the controller 12 is compromised, an indication from another peer that the controller 12 is suspected to be compromised, one or more duplicate messages from the controller 12 or one or more out of sequence messages from the controller 12. In yet another example, the plan 20 may specify a deviation as an unexpected cadence of one or more messages from the controller 12, a degraded response time in one or more messages from the controller 12 or an increased latency in one or more communications with the controller 12.

The plan 20 may also indicate thresholds for compromise determinations, an indication of alternate controllers to be used in the event of a compromise, a rekeying cadence/frequency for the MAC generation keys, a rekeying cadence/frequency for the encryption keys, and so forth. Accordingly, if an attacker 16 attempts to spoof and/or otherwise compromise the controller 12, the peers 14 may notify one another of the security risk posed by the controller 12. The illustrated architecture 10 therefore enables to the peers 14 to negotiate a trust degradation for the controller 12, even though the controller 12 is the central entity that manages the network including the peers 14. The peers 14 may be part of a group that shares the controller 12, wherein other groups of peers may also share the controller 12. In such a case, the peers 14 may be unable to check the integrity of messages from other groups.

Figure 2:
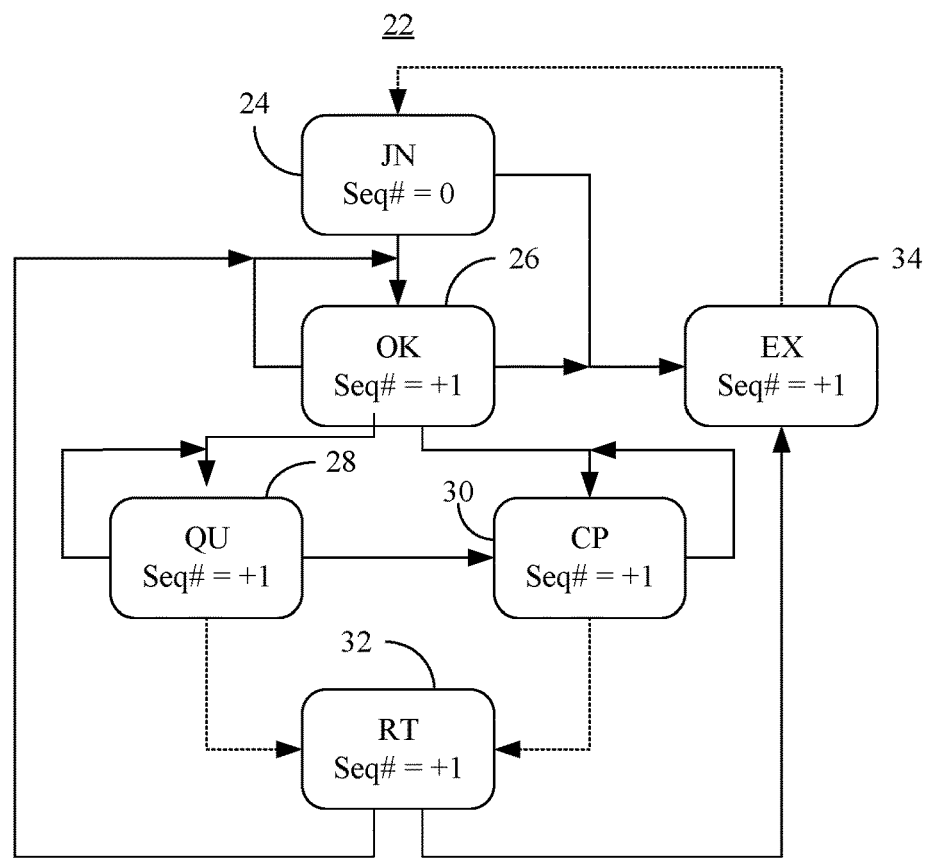
FIG. 2 is a block diagram of an example of a state machine according to an embodiment.

FIG. 2 shows a state machine 22 that may be used to operate a peer such as, for example, one or more of the peers 14 (FIG. 1). As already noted, the peer may be previously (e.g., during manufacturing, assembly and/or post-deployment) provisioned with secure keys such as a symmetric MAC generation key and an encryption key. The encryption key may be used to encrypt messages generated by the peer (e.g., to prevent unauthorized viewing of the messages) and the MAC generation key may be used to ensure to the other peers that a given message has not been tampered with.

The peer may generally be configured to generate messages that include an indication of the state of the peer, a device identifier (ID, e.g., Internet Protocol/IP address), a sequence number, and one or more padding bits. The messages may also optionally include, for example, a new MAC generation key, a new encryption key, an alternate controller address and/or a timestamp. Below are example message formats for unencrypted and encrypted scenarios, with straight brackets "[ ]" referencing optional message fields and parenthesis "( )" referencing message encryption.

Unencrypted:
{ID; Sequence number; Indication; [Time]; [Alternate Controller]; [New MAC Generation Key]; Padding}; MAC Encrypted:
({ID; Sequence number; Indication; [Time]; [Alternate Controller]; [New MAC Generation Key]; [New Encryption Key]; Padding}); MAC The state machine 22 may begin in a join ("JN") state 24 in which the peer transmits a join message to the controller, wherein the join message contains a sequence number of zero. The join message may also include a new MAC generation key and potentially a new encryption key to reduce the impact on a group when one or more peers are compromised. Moreover, the join message may request a list of peers (e.g., complete list or subset) to be used as a baseline for future communications. In the illustrated example, the join message is sent only once upon joining the network. After sending the join message, the illustrated state machine 22 transitions to a default ("OK") state 26 in which the controller is considered not to be compromised. While in the default state 26, the peer may send a default message with an incremented sequence number to the controller.

The peer may generally observe the communication behavior of the controller and determine whether the behavior deviates from a predetermined communication plan. For example, at agreed upon intervals each peer might send another message to be stored by the controller. Each peer may also make requests to the controller at intervals—at the discretion of the peer—for sets of stored messages from other peers—and from time to time may refresh a larger set to act as a baseline against which comparisons may be made. It is on the basis of the responses made by the controller to these requests (and any messages transmitted by the controller) that each peer may make a decision as to whether to continue trusting the controller or to determine that it is compromised.

If the controller is believed to be compromised, the peer may send a message for storage by the controller with this information. Accordingly, if, while in the default state 26, a relatively minor deviation from the communication plan is detected, the state machine 22 may transition to a questionable ("QU") state 28 in which peer generates and sends a notification message indicating that the controller is suspected to be compromised. Similarly, if the peer detects, while in the default state 26, a relatively major deviation from the communication plan, the illustrated state machine 22 transitions to the compromised ("CP") state 30 in which a notification message is generated and sent to signal that the controller is considered to be compromised. The state machine 22 may also transition to the compromised state 30 from the questionable state 28. The distinction between minor deviations and major deviations may be specified via one or more compromise thresholds in the predetermined communication plan.

The state machine 22 may remain in the compromised state 30 as long as either the condition triggering the transition to the compromised state 30 exists or subsequent behavior of the controller has not resulted in an increase in the trustworthiness of the controller. Similarly, the illustrated state machine 22 remains in the questionable state 28 as long as either the condition triggering the transition to the questionable state 28 exists or subsequent behavior of the controller has not resulted in an increase of the trustworthiness of the controller. If, while the peer is in either the questionable state 28 or the compromised state 30, an increase in trustworthiness is detected with respect to the controller, the state machine 22 may transition to a retraction state 32 and generate a retraction message. After transmitting the retraction message to the controller, the state machine 22 may transition to either the default state 26 or an exit ("EX") state 34 in which a message indicating that the peer is exiting the network is sent to the controller. Transitions to the illustrated exit state 34 may also take place from the default state 26 or the join state 24.

Each of the messages generated as the state machine 22 transitions between states may be used, along with a MAC generation key, to generate a MAC, wherein the MAC may be used by the other peers to determine the authenticity of the messages. Moreover, an encryption key may also be used to encrypt the messages so that the controller (or an attacker spoofing the controller) is prevented from successfully opening the messages.

Figure 3A:
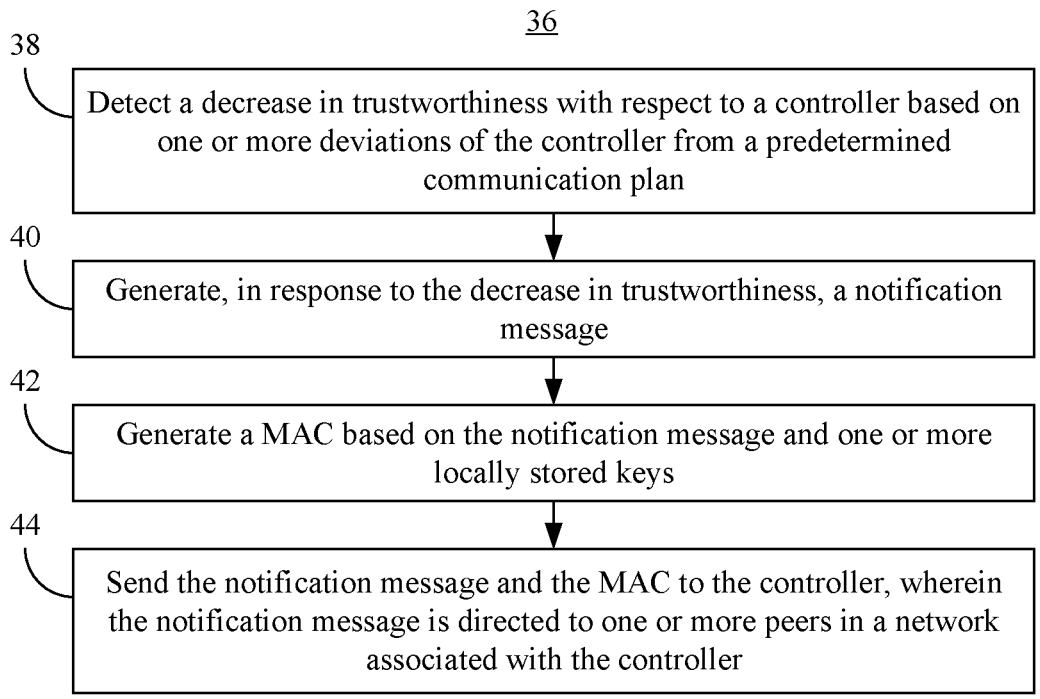
FIGS. 3A and 3B are flowcharts of examples of methods of negotiating trust degradations according to embodiments.

FIG. 3A shows a method 36 of operating a trust degradation apparatus. The method 36 may generally be implemented in a peer such as, for example, one or more of the peers 14 (FIG. 1), already discussed. More particularly, the method 36 may be implemented in one or more modules as a set of logic instructions stored in a machine- or computer-readable storage medium such as random access memory (RAM), read only memory (ROM), programmable ROM (PROM), firmware (FW), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 36 may be written in any combination of one or more programming languages, including an object oriented programming language such as JAVA, SMALLTALK, C++ or the like and conventional procedural programming languages, such as the "C" programming language or similar programming languages.

Illustrated processing block 38 provides for detecting a decrease in trustworthiness with respect to a controller based on one or more deviations of the controller from a predetermined communication plan. As already noted, the one or more deviations may include an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, an increased latency in one or more communications with the controller, etc., or any combination thereof.

Block 40 may generate, in response to the decrease in trustworthiness, a notification message, wherein the notification message may include an indication that the controller is compromised and/or an indication that the controller is suspected to be compromised. The notification message may also include a device identifier, a sequence number, one or more padding bits, and so forth. The padding bits may mask the content of the message so that inferences may not be drawn based on the message size (e.g., to prevent information leakage). In one example, the notification message also includes a new encryption key and/or a new message authentication code (MAC) generation key.

Illustrated block 42 provides for generating a MAC based on the notification and one or more locally stored keys. Block 42 may include, for example, applying a keyed (e.g., cryptographic) hash function to the message to be authenticated and outputting a MAC/tag, which protects both the data integrity and the authenticity of the message by allowing verifiers (who also possess the secret key) to detect any changes to the message content. In one example, block 42 also uses a locally stored encryption key to encrypt the notification message. Block 44 may send the notification message and the MAC to the controller, wherein the notification message is directed/addressed to one or more other peers in a network associated with the controller.

Figure 3B:
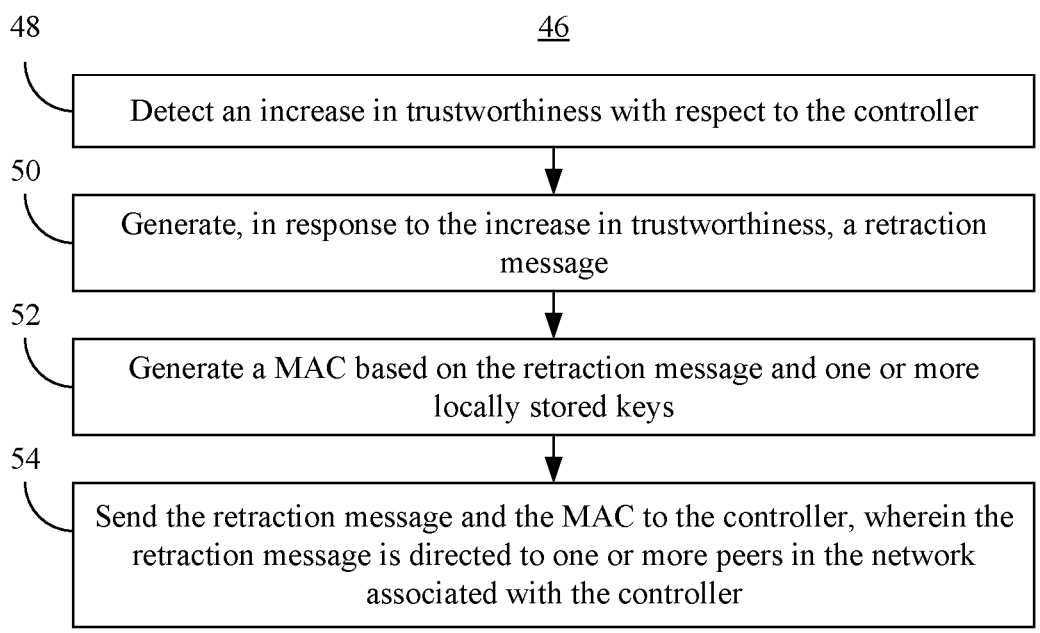

FIG. 3B shows another method 46 of operating a trust degradation apparatus. The method 46 may generally be implemented in a peer such as, for example, one or more of the peers 14 (FIG. 1), already discussed. More particularly, the method 36 may be implemented in one or more modules as a set of logic instructions stored in a machine- or computer-readable storage medium such as RAM, ROM, PROM, FW, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 48 provides for detecting an increase in trustworthiness with respect to a controller based on, for example, a compliance of the controller with a predetermined communication plan. Block 50 may generate, in response to the increase in trustworthiness, a retraction message, wherein a MAC may be generated at block 52 based on the retraction message and one or more locally stored keys. In one example, block 52 also uses a locally stored encryption key to encrypt the retraction message. The retraction message and the MAC may be sent to the controller at block 54, wherein the retraction message may be directed to one or more peers in the network associated with the controller.

Figure 4:
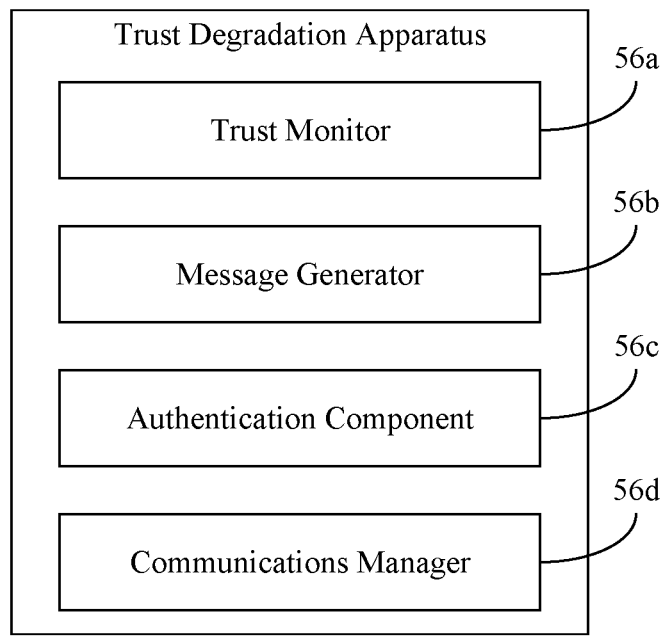
FIG. 4 is a block diagram of an example of a trust degradation apparatus according to an embodiment.

FIG. 4 shows a trust degradation apparatus 56 (56a-56d). The apparatus 56, which may include fixed-functionality logic hardware, configurable logic, logic instructions, etc., or any combination thereof, may generally implement one or more aspects of the method 36 (FIG. 3A) and/or the method 46 (FIG. 3B), already discussed. Moreover, the apparatus 56 may be incorporated into one or more of the peers 14 (FIG. 1), already discussed. In the illustrated example, a trust monitor 56a may detect a decrease in trustworthiness with respect to a controller, wherein the decrease may be detected based on one or more deviations of the controller from a predetermined communication plan. The apparatus 56 may also include a message generator 56b configured to generate, in response to the decrease in trustworthiness, a notification message. As already noted, the notification message may include an indication either that the controller is compromised or that the controller is suspected to be compromised. Moreover, the notification message may include a device identifier, a sequence number, one or more padding bits, an alternate controller address, a timestamp, a new encryption key and/or a new MAC generation key.

An authentication component 56c may generate a first MAC based on the notification message and one or more locally stored keys. In one example, the authentication component 56c also uses a locally stored encryption key to encrypt the notification message. The illustrated apparatus 56 also includes a communications manager 56d to send the notification message and the first MAC to the controller, wherein the notification message is directed to one or more peers in a network associated with the controller. The trust monitor 56a may also detect an increase in trustworthiness with respect to the controller, wherein the message generator 56b may generate, in response to the increase, a retraction message. In such a case, the authentication component 56c may generate a second MAC based on the retraction message and one or more locally stored keys. Moreover, the communications manager 56d may send the retraction message and the second MAC to the controller, wherein the retraction message is directed to one or more peers.

Figure 5:
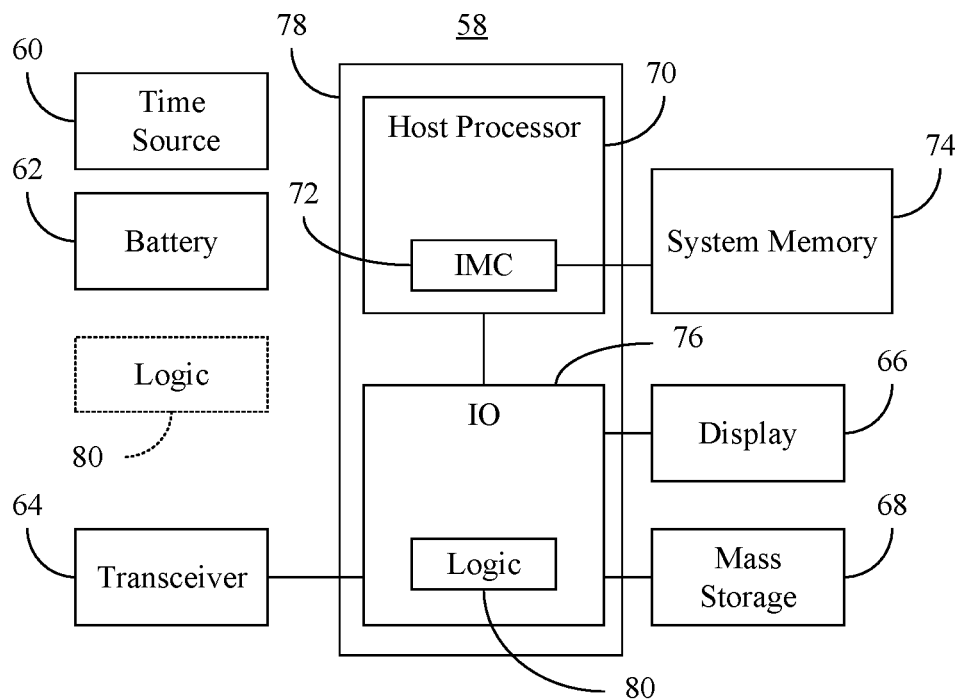
FIG. 5 is a block diagram of an example of a peer device according to an embodiment.

FIG. 5 shows a peer device 58 that may be readily substituted for one or more of the peers 14 (FIG. 1), already discussed. In the illustrated example, the device 58 includes a time source 60 (e.g., crystal oscillator, clock), a battery 62 to supply power to the device 58, a transceiver 64 (e.g., wireless or wired), a display 66 and mass storage 68 (e.g., hard disk drive/HDD, solid state disk/SSD, optical disk, flash memory). The device 58 may also include a host processor 70 (e.g., CPU) having an integrated memory controller (IMC) 72, which may communicate with system memory 74. The system memory 74 may include, for example, dynamic random access memory (DRAM) configured as one or more memory modules such as, for example, dual inline memory modules (DIMMs), small outline DIMMs (SODIMMs), etc. The illustrated device 58 also includes an input output (IO) module 76 implemented together with the processor 70 on a semiconductor die 78 as a system on chip (SoC), wherein the IO module 76 functions as a host device and may communicate with, for example, the display 66, the transceiver 64, the mass storage 68, and so forth. The mass storage 68 may include non-volatile memory (NVM) that stores one or more keys (e.g., MAC generation keys, encryption keys).

The IO module 76 may include logic 80 that causes the semiconductor die 78 to operate as a trust degradation apparatus such as, for example, the apparatus 56 (FIG. 4). Thus, the logic 80 may detect a decrease in trustworthiness with respect to a controller (not shown) that manages a network of peers and generate, in response to the decrease in trustworthiness, a notification message. Additionally, the logic 80 may generate a first MAC based on the notification message and at least one of the key(s) stored in the NVM of the mass storage 68. The logic 80 may also send, via the transceiver 64, the notification message and the first MAC to the controller, wherein the notification message is directed to one or more peers in the network associated with the controller.

Moreover, the logic 80 may detect an increase in trustworthiness with respect to the controller, generate, in response to the increase, a retraction message, generate a second MAC based on the retraction message and the one or more locally stored keys, and send the retraction message and the second MAC to the controller, wherein the retraction message is directed to at least one of the one or more peers. In one example, the time source 60 is autonomous/independent from the controller in order to enhance security (e.g., to prevent the controller from tampering with cadence, frequency, latency and/or timestamp data). The logic 80 may also be implemented elsewhere in the device 58.

Figure 6:
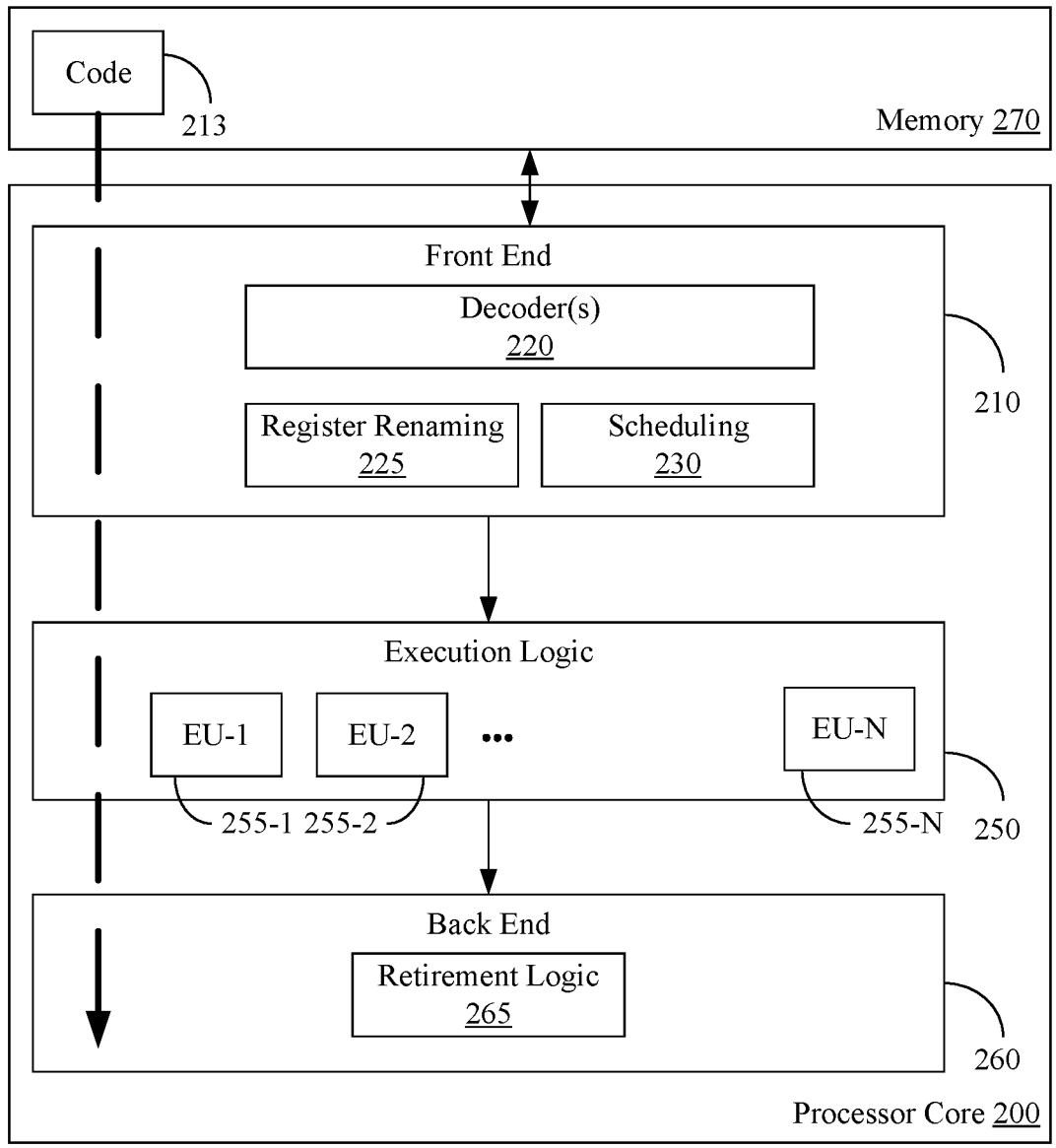
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 36 (FIG. 3A) and/or the method 46 (FIG. 3B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
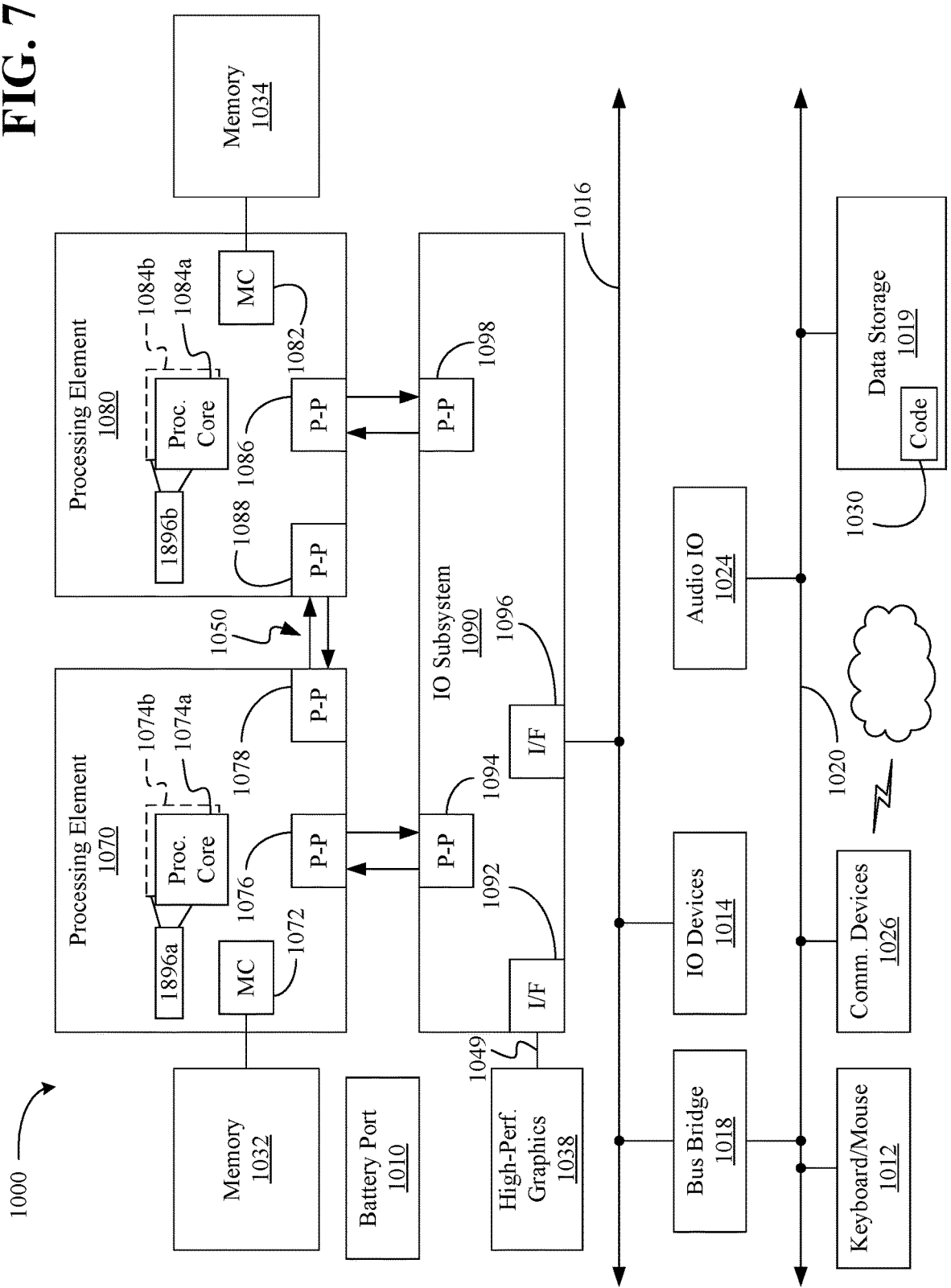
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 36 (FIG. 3A) and/or the method 46 (FIG. 3B), already discussed, and may be similar to the code 213 (FIG. 6), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a security-enhanced peer device comprising a non-volatile memory to store one or more keys, a transceiver, a time source that is autonomous from a controller, and a trust degradation apparatus communicatively coupled to the non-volatile memory, the transceiver, and the time source, the trust degradation apparatus including a message generator to generate, in response to a decrease in trustworthiness with respect to the controller, a notification message, an authentication component to generate a first message authentication code (MAC) based on the notification message and at least one of the one or more keys, and a communications manager to send, via the transceiver, the notification message and the first MAC to the controller, wherein the notification message is to be directed to one or more peers in a network associated with the controller.

Example 2 may include the device of Example 1, wherein the notification message is to include one or more of an indication that the controller is compromised or an indication that the controller is suspected to be compromised.

Example 3 may include the device of Example 1, wherein the notification message is to include a device identifier, a sequence number and one or more padding bits.

Example 4 may include the device of Example 3, wherein the notification message is to further include one or more of an alternate controller address, a timestamp, a new encryption key or a new MAC generation key.

Example 5 may include the device of Example 1, wherein the message generator is to generate, in response to an increase in trustworthiness with respect to the controller, a retraction message, the authentication component is to generate a second MAC based on the retraction message and at least one of the one or more keys, and the communications manager is to send, via the transceiver, the retraction message and the second MAC to the controller, and wherein the retraction message is to be directed to at least one of the one or more peers.

Example 6 may include the device of any one of Examples 1 to 5, wherein the trust degradation apparatus further includes a trust monitor to detect the decrease in trustworthiness based on one or more deviations of the controller from a predetermined communication plan, wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

Example 7 may include a trust degradation apparatus comprising a message generator to generate, in response to a decrease in trustworthiness with respect to a controller, a notification message, an authentication component to generate a first message authentication code (MAC) based on the notification message and one or more locally stored keys, and a communications manager to send the notification message and the first MAC to the controller, wherein the notification message is to be directed to one or more peers in a network associated with the controller.

Example 8 may include the apparatus of Example 7, wherein the notification message is to include one or more of an indication that the controller is compromised or an indication that the controller is suspected to be compromised.

Example 9 may include the apparatus of Example 7, wherein the notification message is to include a device identifier, a sequence number and one or more padding bits.

Example 10 may include the apparatus of Example 9, wherein the notification message is to further include one or more of an alternate controller address, a timestamp, a new encryption key or a new MAC generation key.

Example 11 may include the apparatus of Example 7, wherein the message generator is to generate, in response to an increase in trustworthiness with respect to the controller, a retraction message, the authentication component is to generate a second MAC based on the retraction message and the one or more locally stored keys, and the communications manager is to send the retraction message and the second MAC to the controller, and wherein the retraction message is to be directed to at least one of the one or more peers.

Example 12 may include the apparatus of any one of Examples 7 to 11, further including a trust monitor to detect the decrease in trustworthiness based on one or more deviations of the controller from a predetermined communication plan, wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

Example 13 may include the apparatus of any one of Examples 7 to 11, wherein the authentication component is to use at least one of the one or more locally stored keys to encrypt the notification message.

Example 14 may include a method of operating a trust degradation apparatus, comprising generating, in response to a decrease in trustworthiness with respect to a controller, a notification message, generating a first message authentication code (MAC) based on the notification message and one or more locally stored keys, and sending the notification message and the first MAC to the controller, wherein the notification message is directed to one or more per devices in a network associated with the controller.

Example 15 may include the method of Example 14, wherein the notification message includes one or more of an indication that the controller is compromised or an indication that the controller is suspected to be compromised.

Example 16 may include the method of Example 14, wherein the notification message includes a device identifier, a sequence number and one or more padding bits.

Example 17 may include the method of Example 16, wherein the notification message further includes one or more of an alternate controller address, a timestamp, a new encryption key or a new MAC generation key.

Example 18 may include the method of any one of Examples 14 to 17, further including generating, in response to an increase in trustworthiness with respect to the controller, a retraction message, generating a second MAC based on the retraction message and the one or more locally stored keys, and sending the retraction message and the second MAC to the controller, wherein the retraction message is directed to at least one of the one or more peers.

Example 19 may include at least one computer readable storage medium comprising a set of instructions, which when executed by a computing device, cause the computing device to generate, in response to a decrease in trustworthiness with respect to a controller, a notification message, generate a first message authentication code (MAC) based on the notification message and one or more locally stored keys, and send the notification message and the first MAC to the controller, wherein the notification message is to be directed to one or more peers in a network associated with the controller.

Example 20 may include the at least one computer readable storage medium of Example 19, wherein the notification message is to include one or more of an indication that the controller is compromised or an indication that the controller is suspected to be compromised.

Example 21 may include the at least one computer readable storage medium of Example 19, wherein the notification message is to include a device identifier, a sequence number and one or more padding bits.

Example 22 may include the at least one computer readable storage medium of Example 21, wherein the notification message is to further include one or more of an alternate controller address, a timestamp, a new encryption key or a new MAC generation key.

Example 23 may include the at least one computer readable storage medium of Example 19, wherein the instructions, when executed, cause the computing device to generate, in response to an increase in trustworthiness with respect to the controller, a retraction message, generate a second MAC based on the retraction message and the one or more locally stored keys, and send the retraction message and the second MAC to the controller, wherein the retraction message is to be directed to at least one of the one or more peers.

Example 24 may include the at least one computer readable storage medium of any one of Examples 19 to 23, wherein the instructions, when executed, cause the computing device to detect the decrease in trustworthiness based on one or more deviations of the controller from a predetermined communication plan, and wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

Example 25 may include the at least one computer readable storage medium of any one of Examples 19 to 23, wherein the instructions, when executed, cause the computing device to use at least one of the one or more locally stored keys to encrypt the notification message.

Example 26 may include a trust degradation apparatus comprising means for generating, in response to a decrease in trustworthiness with respect to a controller, a notification message, means for generating a first message authentication code (MAC) based on the notification message and one or more locally stored keys, and means for sending the notification message and the first MAC to the controller, wherein the notification message is directed to one or more peers in a network associated with the controller.

Example 27 may include the apparatus of Example 26, wherein the notification message is to include one or more of an indication that the controller is compromised or an indication that the controller is suspected to be compromised.

Example 28 may include the apparatus of Example 26, wherein the notification message is to include a device identifier, a sequence number and one or more padding bits.

Example 29 may include the apparatus of Example 28, wherein the notification message is to further include one or more of an alternate controller address, a timestamp, a new encryption key or a new MAC generation key.

Example 30 may include the apparatus of any one of Examples 26 to 29, further including means for generating, in response to an increase in trustworthiness with respect to the controller, a retraction message, means for generating a second MAC based on the retraction message and the one or more locally stored keys, and means for sending the retraction message and the second MAC to the controller, wherein the retraction message is directed to at least one of the one or more peers.

Thus, techniques described herein may to enable client entities—"peers"—to communicate indirectly, via a central entity in such a way that two or more of the peers may reach remote agreement that the controller or a peer (or set of peers) has (or have) been compromised. Accordingly, security may be improved in a wide variety of applications such as, for example, SDN, network functions virtualization (NFV), TOT, and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A device comprising:
a non-volatile memory to store one or more keys;
a transceiver;
a time source that is autonomous from a controller; and
a trust degradation apparatus communicatively coupled to the non-volatile memory, the transceiver, and the time source, the trust degradation apparatus including,
a message generator to generate, in response to a decrease in trustworthiness with respect to the controller, a notification message;
an authentication component to generate a first message authentication code (MAC) based on the notification message and at least one of the one or more keys; and
a communications manager to send, via the transceiver, the notification message and the first MAC to the controller, wherein the notification message is to be directed to one or more peers in a network associated with the controller,
wherein the message generator is to generate, in response to an increase in trustworthiness with respect to the controller, a retraction message, the authentication component is to generate a second MAC based on the retraction message and at least one of the one or more keys, and the communications manager is to send, via the transceiver, the retraction message and the second MAC to the controller, and wherein the retraction message is to be directed to at least one of the one or more peers.

2. The device of claim 1, wherein the notification message is to include one or more of an indication that the controller is compromised or an indication that the controller is suspected to be compromised.

3. The device of claim 1, wherein the notification message is to include a device identifier, a sequence number and one or more padding bits.

4. The device of claim 3, wherein the notification message is to further include one or more of an alternate controller address, a timestamp, a new encryption key or a new MAC generation key.

5. The device of claim 1, wherein the trust degradation apparatus further includes a trust monitor to detect the decrease in trustworthiness based on one or more deviations of the controller from a predetermined communication plan, wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

6. An apparatus comprising:
a message generator to generate, in response to a decrease in trustworthiness with respect to a controller, a notification message;
an authentication component to generate a first message authentication code (MAC) based on the notification message and one or more locally stored keys; and
a communications manager to send the notification message and the first MAC to the controller, wherein the notification message is to be directed to one or more peers in a network associated with the controller,
wherein the message generator is to generate, in response to an increase in trustworthiness with respect to the controller, a retraction message, the authentication component is to generate a second MAC based on the retraction message and the one or more locally stored keys, and the communications manager is to send the retraction message and the second MAC to the controller, and wherein the retraction message is to be directed to at least one of the one or more peers.

7. The apparatus of claim 6, wherein the notification message is to include one or more of an indication that the controller is compromised or an indication that the controller is suspected to be compromised.

8. The apparatus of claim 6, wherein the notification message is to include a device identifier, a sequence number and one or more padding bits.

9. The apparatus of claim 8, wherein the notification message is to further include one or more of an alternate controller address, a timestamp, a new encryption key or a new MAC generation key.

10. The apparatus of claim 6, further including a trust monitor to detect the decrease in trustworthiness based on one or more deviations of the controller from a predetermined communication plan, wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

11. The apparatus of claim 6, wherein the authentication component is to use at least one of the one or more locally stored keys to encrypt the notification message.

12. A method comprising:
generating, in response to a decrease in trustworthiness with respect to a controller, a notification message;
generating a first message authentication code (MAC) based on the notification message and one or more locally stored keys;
sending the notification message and the first MAC to the controller, wherein the notification message is directed to one or more peers in a network associated with the controller;
generating, in response to an increase in trustworthiness with respect to the controller, a retraction message;
generating a second MAC based on the retraction message and the one or more locally stored keys; and
sending the retraction message and the second MAC to the controller, wherein the retraction message is directed to at least one of the one or more peers.

13. The method of claim 12, wherein the notification message includes one or more of an indication that the controller is compromised or an indication that the controller is suspected to be compromised.

14. The method of claim 12, wherein the notification message includes a device identifier, a sequence number and one or more padding bits.

15. The method of claim 14, wherein the notification message further includes one or more of an alternate controller address, a timestamp, a new encryption key or a new MAC generation key.

16. At least one non-transitory computer readable storage medium comprising a set of instructions, which when executed by a computing device, cause the computing device to:
generate, in response to a decrease in trustworthiness with respect to a controller, a notification message;
generate a first message authentication code (MAC) based on the notification message and one or more locally stored keys;
send the notification message and the first MAC to the controller, wherein the notification message is to be directed to one or more peers in a network associated with the controller;
generate, in response to an increase in trustworthiness with respect to the controller, a retraction message;
generate a second MAC based on the retraction message and the one or more locally stored keys; and
send the retraction message and the second MAC to the controller, wherein the retraction message is to be directed to at least one of the one or more peers.

17. The at least one computer readable storage medium of claim 16, wherein the notification message is to include one or more of an indication that the controller is compromised or an indication that the controller is suspected to be compromised.

18. The at least one computer readable storage medium of claim 16, wherein the notification message is to include a device identifier, a sequence number and one or more padding bits.

19. The at least one computer readable storage medium of claim 18, wherein the notification message is to further include one or more of an alternate controller address, a timestamp, a new encryption key or a new MAC generation key.

20. The at least one computer readable storage medium of claim 16, wherein the instructions, when executed, cause the computing device to detect the decrease in trustworthiness based on one or more deviations of the controller from a predetermined communication plan, and wherein the one or more deviations include one or more of an unauthorized modification of one or more messages, a refusal of the controller to send one or more messages, a failure of the controller to send one or more messages, one or more missing messages in an inbound communication from the controller, one or more missing messages in an outbound communication to the controller, an indication from another peer that the controller is compromised, an indication from another peer that the controller is suspected to be compromised, one or more duplicate messages from the controller, one or more out of sequence messages from the controller, an unexpected cadence of one or more messages from the controller, a degraded response time in one or more messages from the controller, or an increased latency in one or more communications with the controller.

21. The at least one non-transitory computer readable storage medium of claim 16, wherein the instructions, when executed, cause the computing device to use at least one of the one or more locally stored keys to encrypt the notification message.

* * * * *